United States Patent [19]
> Mayer

[11] 4,382,822

[45] May 10, 1983

[54] SYNTHETIC RHOMBOHEDRAL MAGNETITE PIGMENT

[75] Inventor: Ernest Mayer, Easton, Pa.

[73] Assignee: Pfizer Inc., New York, N.Y.

[21] Appl. No.: 223,461

[22] Filed: Jan. 8, 1981

Related U.S. Application Data

[63] Continuation of Ser. No. 75,628, Sep. 14, 1979, abandoned, which is a continuation-in-part of Ser. No. 10,647, Feb. 9, 1979, abandoned.

[51] Int. Cl.$^3$ .............................................. C01G 49/08
[52] U.S. Cl. ................................ 106/304; 252/62.56; 423/632
[58] Field of Search .............................. 423/632, 633; 252/62.56; 106/304

[56] References Cited

U.S. PATENT DOCUMENTS

| | | | |
|---|---|---|---|
| 1,269,442 | 6/1918 | Hoffman | 423/142 |
| 1,824,936 | 9/1931 | Travers | 423/529 |
| 3,141,738 | 7/1964 | Kagitani | 423/632 |
| 3,261,665 | 7/1966 | Rathmell | 423/632 X |
| 3,434,797 | 3/1969 | Taylor et al. | 23/90 |
| 3,617,560 | 11/1971 | Deul et al. | 210/47 |
| 3,617,562 | 11/1971 | Cywin et al. | 210/48 |
| 3,927,173 | 12/1975 | Melzer | 423/142 |
| 4,025,611 | 4/1977 | Montino et al. | 423/632 X |
| 4,090,888 | 5/1978 | Rademachers et al. | 106/304 |
| 4,107,267 | 8/1978 | Hansen | 423/138 |
| 4,123,501 | 10/1978 | Kohler et al. | 423/152 |
| 4,150,095 | 4/1979 | Kunda | 423/145 |

FOREIGN PATENT DOCUMENTS

1218601 1/1971 United Kingdom .

OTHER PUBLICATIONS

Bond "Crystal Technology", John Wiley & Sons, 1976, p. 20.

*Primary Examiner*—Jack Cooper
*Attorney, Agent, or Firm*—Connolly & Hutz

[57] ABSTRACT

In a process to produce a synthetic rhombehedral magnetite comprising the steps of:

A. Contacting ferrous chloride solution having an $Fe^{++}$ concentration of from about 0.9 to 2.4 moles per liter with a stoichiometric amount of carbonate ion;

B. heating the mixture to a temperature of from about 70°–90° C.;

C. aerating the mixture to oxidize the iron to magnetite having a $Fe^{++}$/ total $Fe^{++}$ and $Fe^{+++}$ ratio of from about 0.25–0.38; and D. recovering the magnetite so produced, the improvement which comprises providing the carbonate in the form of finely divided particles of an average size of less than 3.5 microns.

The process wherein said magnetite is calcined at a temperature of from 650°–925° C. in the presence of oxygen to produce alpha ferric oxide is claimed and a synthetic rhombohedral magnetite having a BET surface area of greater than about 13 $m^2/g$ and an average particle size of less than about 0.08 microns as measures along the long axis is also claimed.

2 Claims, No Drawings

SYNTHETIC RHOMBOHEDRAL MAGNETITE PIGMENT

CROSS REFERENCE TO RELATED APPLICATIONS

This application is a continuation of application Ser. No. 075,628 filed Sept. 14, 1979, now abandoned which was a continuation-in-part of application Ser. No. 010,647 filed Feb. 9, 1979, now abandoned.

BACKGROUND OF THE INVENTION

This invention relates to magnetite useful as pigment. In particular it relates to synthetic rhombohedral magnetite which is useful as a black pigment and which is also capable of being calcined in the presence of oxygen into an alpha-ferric oxide red pigment. This magnetite is prepared from waste pickle liquor by the addition of carbonate, preferably in the form of limestone or soda ash.

Numerous patents have issued in the past for processes of making iron oxide from pickle liquor. The following U.S. and foreign patents are representative of the technology as it exists today: U.S. Pat. Nos. 1,269,442; 1,824,936; 3,261,665; 3,434,797; 3,617,560; 3,617,562; 3,927,173; 4,090,888; 4,107,267; and U.K. Pat. No. 1,218,601. All of these patents call for the treating of waste pickle liquor with some form of base to produce an iron oxide. In most cases the iron oxide produced is a black oxide which can be used as a pigment and in some cases this black oxide is further calcined to produce a brown or red pigment.

It is the present invention that for the first time produces from waste pickle liquor and carbonate a synthetic rhombohedral magnetite which is superior as to tinting strength and unique as to particle size as evidenced by the high surface areas observed. Furthermore, this novel magnetite may be calcined in the presence of oxygen to a red pigment of very acceptable color characteristics and of a very low cost.

SUMMARY OF THE INVENTION

The present invention comprises a process to produce a synthetic rhombohedral magnetite comprising the steps of:

A. Contacting ferrous chloride solution having an $Fe^{++}$ concentration of from about 0.9 to 2.4 moles per liter with a stoichiometric amount of carbonate ion;

B. heating the mixture to a temperature of from about 70°–90° C.;

C. aerating the mixture to oxidize the iron to magnetite having a $Fe^{++}$/total $Fe^{++}$ and $Fe^{+++}$ ratio of from about 0.25–0.38; and D. recovering the magnetite so produced, the improvement which comprises providing the carbonate in the form of finely divided particles of an average size of less than 3.5 microns.

The process is preferred wherein said magnetite is calcined at a temperature of from 650°–925° C. in the presence of oxygen to produce alpha ferric oxide, wherein said ferrous chloride solution comprises waste picle liquor from steel manufacture, and wherein said carbonate is calcium carbonate.

A synthetic rhombohedral magnetite produced by the process of this invention is also claimed.

A synthetic rhombohedral magnetite having a BET surface area of greater than about 13 $m^2/g$ and a average particle size of less than about 0.08 microns as measured along the long axis is also claimed. Such material will range in size from about 0.04 to 0.08 microns.

DETAILED DESCRIPTION OF THE INVENTION

The novel synthetic rhombohedral magnetite of the present invention is unique in the following ways when compared to magnetite in the prior art and with commercially available magnetite today: (1) high relative tinting strength, (2) low tinting strength Y value, (3) high surface area, (4) small particle size.

A typical tinting strength Y value of the magnetite of this invention is shown in Table 1 to be 15.78. The tinting strength Y values of commercially available competing magnetites range from 17.73 to 25.05 as can be seen in Table 1. This measurement is made using the FMC-II color equation and a Diano-Hardy spectrophotometer. The samples are prepared by mixing 0.5 gram of pigment and 1.5 grams of titanium dioxide in a dispersing oil on a Hoover muller. Then 10 grams of nitrocellulose laquer (Fuller-Obrien No. 813-C-1011) is added and mixed well. A 6 mil wet draw-down is then made on Morest White Cards and left to dry. As is well known in the art, a lower number for Y is desirable because it represents a darker hue, which, in this case, indicates greater black tinting strength.

Relative tinting strength is a comparison of the novel magnetite of this invention and Pfizer's commercially available BK-5000 premium magnetite which has been assigned an arbitrary relative tinting strength value of 100. The measurement is made using the Applied Color System "Q-check" program and a Diano-Hardy spectrophotometer. The samples are prepared as described above for the Y value measurement. Table 1 shows that a typical preparation of the magnetite of this invention has a relative tinting strength of 109.7 while commercially available competing products have values ranging from 54.7 to 100.0.

TABLE 1

| | Y Value | Relative Tinting Strength |
|---|---|---|
| Typical Preparation of Claimed Magnetite | 15.78 | 109.7 |
| Pfizer's BK-5000 magnetite | 17.73 | 100.0 |
| Reichard-Coulston #724 | 18.93 | 84.9 |
| Pfizer's BK-5099 magnetite | 19.89 | 78.7 |
| Bayer's #306 | 23.49 | 60.9 |
| Toda Kogyo KM-340 | 25.05 | 54.7 |

The mean particle size of the magnetite of the present invention is considerably smaller than that of known magnetites; viz, the magnetite of this invention is about half the size of commercially available synthetic magnetites with which it would be expected to compete in the market place. Table 2 shows that the magnetite of this invention is less than approximately 0.08 microns in length (the size measurement is taken along the long axis of the particles using the Quantimet Image technique (Cambridge Imanco "Quantimet 720, System 20 Image Analyzer" with a Chords technique on transmission electron micrographs at 35,000X) and that comparable commercially available magnetites are generally in the range of 0.155–0.197 microns in length. Other commercially available competing magnetites range in length from 0.13–0.30 microns.

The size uniformity of the instant magnetite is superior to commercially available products as evidenced by Quantimet particle size distribution measurements.

Due to this small size and narrow particle size distribution (high degree of particle size uniformity) the magnetite of the invention exhibits uniquely high surface area (as measured by the BET method) as is seen in Table 2. The BET method is the standard method in the art and a full description of it is found in "Adsorption, Surface Area, and Porosity," by S. J. Gregg and K. S. W. Sing, Academic Press, 1967: Chapter 2. Table 2 shows that a typical preparation of the magnetite of this invention has a BET surface area of 18.3 m²/g while competing products have values of about 8.6 m²/g.

TABLE 2

|  | Particle Size (microns) | BET Surface Area (m²/g) |
| --- | --- | --- |
| Typical Preparation of Claimed Magnetite | 0.077 | 18.3 |
| Pfizer's BK-5000 | 0.197 | 8.6 |
| Pfizer's BK-5599 | 0.155 | 8.6 |

It is known in the art that the smaller the particle size is the greater the surface area must be. We have observed BET surface areas as high as 32.5 m²/g and particle sizes as low as 0.048 microns.

The shape of the magnetite particles of this invention was determined by transmission electron microscopy. Using this technique it was established that the particles are rhombohedral and have 60° angles.

The novel material of the present invention may be prepared from waste pickle liquor of both the hydrochloric acid (ferrous chloride) and sulfuric acid (ferrous sulfate) types. Typical pickle liquor will generally have an $Fe^{++}$ concentration of 0.9 to 2.4 moles per liter. The pickle liquor may be used as it comes from the steel mill or it may be pre-neutralized or concentrated by heating in the presence of scrap iron or by the addition of base. At times it may be desirable to dilute the pickle liquor to obtain the desired concentration. When using neutralized liquor only a stoichiometric amount of alkali is required; in fact, preferably no more than that amount is used because excess carbonate results in carbonate contamination of the black oxide. When using pickle liquor that has not been pre-neutralized, sufficient additional alkali must be used to neutralize the free acid.

The alkali used may be chosen from calcium carbonate, barium carbonate, sodium carbonate or strontium carbonate. These carbonates may be natural products or they may be manufactured (precipitated) so long as they are less than about 3.5 microns in length. Preferred alkalies are limestone with a particle size of up to about 3.5 microns, and soda ash. Generally, the process can be summarized as follows:

(a) a stoichiometric amount of carbonate is added to an aqueous iron salt solution (pickle liquor) while stirring;

(b) after heating the mixture to about 80° C. aeration is commenced;

(c) agitation, aeration, and heating is continued until the reaction is complete. This can be determined either by titration for percent $Fe^{++}$ compared to the total of the $Fe^{++}$ and $Fe^{+++}$ in the magnetite slurry (nominal 33 percent) or by electroanalytic techniques, i.e., measuring the oxidation-reduction potential using an electrometer with a platinum combination electrode;

(d) the resulting magnetite is recovered (e.g. by filtration), washed, and optionally dried, after which the product may be used as a black pigment or it can be calcined, generally at temperatures above about 650° C. and below about 925° C., in the presence of air to a red pigment;

(e) the red pigment can then be further processed by milling if desired.

One of the advantages of the present invention is that the costly hydrochloric acid used in the pickling of steel may be regenerated and returned to the pickling plant. If this is desired, the filtrate remaining after the removal of the black pigment is acidified with $H_2SO_4$ to regenerate HCl. The reaction involved is as follows:

$$2H_2O + CaCl_2 + H_2SO_4 \rightarrow CaSO_4 \cdot 2H_2O + 2HCl$$

The waste product, gypsum, may be used as a building material or as landfill as desired.

In the case of processes which use $H_2SO_4$ to pickle steel, $CaCO_3$ and $BaCO_3$ cannot be used as the alkali because insoluble gypsum ($CaSO_4 \cdot 2H_2O$) or $BaSO_4$ will precipitate along with the magnetite and contaminate the black pigment. In that instance, $Na_2CO_3$ is appropriate.

In cases where $H_2SO_4$ pickle liquor is used and $Na_2CO_3$ is the base the $Na_2SO_4$ soluble salt remaining after the $FeSO_4$ and $Na_2CO_3$ reaction is usually sewered for economic reasons, and thus, acid regeneration is not generally practiced in the $FeSO_4/Na_2CO_3$ scheme.

A preferred embodiment of this invention is as follows: to a neutralized aqueous ferrous chloride solution containing from about 111 to 381 g $FeCl_2$ per liter is added a stoichiometric amount of fine sized calcium carbonate while moderately agitating the mixture. The preferred average calcium carbonate particle size is between about 0.6 and 3.5 microns. The temperature of the ferrous chloride should be kept below 65° C. and may be ambient at the time of the alkali addition. After the calcium carbonate is added the mixture is rapidly heated to 80° C. at which time air is introduced into the mixture. The agitation rate is preferably increased and the aeration is continued until the reaction is complete. The solids are then separated (e.g. by filtration), washed, and dried. The dried black may then be milled to a finished product.

In the especially preferred embodiment of this invention the $Fe^{++}$ concentration in the pickle liquor will vary from 1.4 to 2.4 moles per liter and, of course, a stoichiometric amount of calcium carbonate will be used. The calcium carbonate particles will range in size from 0.68 to 2.5 microns. The precipitation will be carried out at between 20° and 65° C. and the oxidation will be carried out at between 75° and 85° C. Economic considerations will usually dictate a shorter oxidation time. The time employed in the oxidation will be determined by the air flow rate, the agitation and the temperature. At preferred air flow rates from about 14 to 42 l/min.) and preferred agitation (from 300 to 600 RPM using a pitched blade turbine) the reaction is usually complete in from about 230 to 815 minutes.

If one desires to convert the magnetite into a red pigment, the magnetite is charged into a kiln as a wet filter cake or as a dry powder and it is calcined in the presence of oxygen. After calcination the red iron oxide is then preferably milled to the desired fineness, a particle size of from about 0.1 to 1.0 microns being usual as measured by a Micromeritics 5000 D sedigraph.

The following examples are merely illustrative and in no way limit the scope of the appended claims.

EXAMPLE 1

45 Liters of ferrous chloride solution containing 300 grams per liter $FeCl_2$ was placed in a 20 gallon reactor equipped with an agitator. The solution was heated to 65° C. while stirring. When a temperature of 65° C. was reached, a stoichiometric amount, 10.662 kilograms, of a precipitated calcium carbonate having an average particle size of 1.8 microns was added over a 10 minute period. The mixture was aerated at a rate of 28 liters per minute and the agitation was increased to 600 RPM. The mixture was heated to 83° C. and was stirred and aerated while maintaining the temperature between 78° C. and 83° C. until the reaction was complete. The total reaction time after the alkali addition was completed was 360 minutes. The slurry was filtered, washed, and dried at 70° C. The resulting product had a BET surface area of 25.7 $m^2/g$, a relative tinting strength of 105.9 and a mean (harmonic) particle size of 0.052 microns.

10 grams of the dried magnetite was placed in a stainless steel tray and the tray was placed into a laboratory muffle furnace, Thermolyne model 2000, which was previously set at 816° C. The sample was heated for 30 minutes after which it was removed from the kiln and deagglomerated. Standard draw downs were prepared as previously described for the magnetite and the sample was found to be an intermediate shade of red of clear, bright characteristics.

EXAMPLE 2

41.8 Liters of ferrous chloride solution containing 171.8 grams per liter $FeCl_2$ was placed in a 20 gallon reactor equipped with an agitator. While stirring at 300 RPM the solution was heated to 65° C. A 19.5 liter slurry containing 5.672 kilograms of ground natural limestone having an average particle size of 1.8 microns was then added. The mixture was heated to 80° C. and maintained at 78° C. to 81° C. while stirring at 300 RPM and aerating at 14 liters of air per minute until the reaction was complete. The total reaction time after the alkali addition was completed was 444 minutes. The solids were collected by filtration, then washed and dried at 70° C. The resulting product had a BET surface area of 22.0 $m^2/g$, a relative tinting strength of 116.1 and a mean (harmonic) particle size of 0.066 microns.

A 10 gram sample of the magnetite was calcined as described in Example 1. In this case the oxide was found to be a light shade, high chroma red.

EXAMPLE 3

45 Liters of ferrous sulfate solution containing 257.9 grams per liter $FeSO_4$ was placed in a 20 gallon reactor equipped with an agitator. The solution was heated to 65° C. while stirring at 300 RPM and then over a 22 minute period 8.106 kilograms of commercial, technical grade sodium carbonate ($Na_2CO_3$) was added. The mixture was heated to 80° C. and air was introduced into the mixture at a rate of 14 liters per minute. The mixture was stirred and aerated while maintaining the temperature between 77° C. and 82° C. until the reaction was complete. The total reaction time after the alkali addition was complete was 815 minutes. The solids were separated by filtration, washed, and dried at 70° C. The resulting product had a BET surface area of 15.8 $m^2/g$, a relative tinting strength of 109.6 and a mean (harmonic) particle size of 0.078 microns.

EXAMPLE 4

45 Liters of (unneutralized) ferrous chloride solution (pH 0.5) containing 250 grams per liter $FeCl_2$ was placed in a 20 gallon reactor equipped with an agitator. To neutralize the free hydrochloric acid 1.172 kilograms of ground natural limestone having an average particle size of 2.5 microns was added while stirring at 65° C. The mixture was heated to 80° C. and air was introduced into the mixture at a rate of 42 liters per minute. Then over a 5 minute period an additional 8.878 kilograms of the above described limestone was added. After the alkali addition, the mixture was stirred and aerated while maintaining the temperature between 79° C. and 81° C. until the reaction was complete (741 minutes). The solids were separated by filtration, washed, and dried at 70° C. The resulting magnetite product had a BET surface area of 20.6, a relative tinting strength of 110.1 and a mean (harmonic) particle size of 0.065 microns.

A 10 gram sample of the magnetite was calcined as described in Example 1. In this case an intermediate red pigment was obtained.

EXAMPLE 5

Magnetite was prepared by precipitation as described in Example 1. The iron salt solution used was ferrous chloride and the alkali was a precipitated calcium carbonate with a 2.2 micron average particle size. The procedure was repeated seven times, the resulting slurries were combined, after which the solids were separated by filtration, washed, and dried. The process conditions are described in the following table.

| $FeCl_2$ Conc. (g/l) | Precip. Temp. (°C.) | Oxd. Temp. (°C.) | Oxd. Time (Min.) | Agitation (RPM) | Air Rate (1/min) |
|---|---|---|---|---|---|
| 280.3 | Ambient | 80 | 345 | 600 | 28 |
| 280.3 | " | " | 300 | " | " |
| 234.6 | " | " | 232 | " | " |
| 234.6 | " | " | 249 | " | " |
| 243.8 | " | " | 244 | " | " |
| 243.8 | " | " | 269 | " | " |
| 244.8 | " | " | 619 | " | " |

The composite product had a relative tinting strength of 109.6, a surface area of 18.3 $m^2/g$ and a mean (harmonic) particle size of 0.071 microns.

EXAMPLE 6

45 Liters of ferrous chloride solution containing 229 grams per liter $FeCl_2$ was placed in a 20-gallon reactor equipped with an agitator. While stirring at 300 rpm the solution was heated to 65° C. Over a four minute period 10.639 kilograms of precipitated calcium carbonate having an average particle size of 0.68 microns was added. The mixture was heated to 80° C. and air was introduced into the mixture. The mixture was maintained at 80° C. under agitation and aeration until the reaction was complete. The agitation speed was 600 rpm and the air rate was 28 liters per minute. The total reaction time was 264 minutes. The solids were separated by filtration, washed and dried at 70° C. The resulting magnetite product had a BET surface area of 31.5 $m^2/g$ a relative tinting strength of 134.6 and a mean (harmonic) particle size of 0.048 microns.

I claim:

1. A synthetic rhombohedral magnetite having 60 degree angles, a tinting strength Y value not greater than about 15.78, a BET surface area of greater than about 13 m²/g and an average particle size of less than about 0.08 microns as measured along the long axis.

2. A synthetic rhombohedral magnetite having 60 degree angles, a tinting strength Y value not greater than about 15.78, a BET surface area of greater than about 13 m²/g and an average particle size of less than about 0.08 microns as measured along the long axis produced by a process comprising the steps of:

(A) contacting ferrous chloride solution having an $Fe^{++}$ concentration of from about 0.9 to 2.4 moles per liter with a stoichiometric amount of carbonate ion;

(B) heating the mixture to a temperature of from about 70°–90° C.;

(C) aerating the mixture to oxidize the iron to magnetite having a $Fe^{++}$/total $Fe^{++}$ and $Fe^{+++}$ ratio of from about 0.25–0.38; and (D) recovering the magnetite so produced, said carbonate being provided in the form of finely divided particles of an average size of less than 3.5 microns.

* * * * *